US009407901B2

(12) United States Patent
Lee et al.

(10) Patent No.: US 9,407,901 B2
(45) Date of Patent: Aug. 2, 2016

(54) METHOD OF DISPLAYING CONTENT LIST USING 3D GUI AND 3D DISPLAY APPARATUS APPLIED TO THE SAME

(75) Inventors: Hye-won Lee, Gyeonggi-do (KR); Sang-il Lee, Gyeonggi-do (KR); Su-jin Yeon, Seoul (KR); Bo-mi Kim, Gyeonggi-do (KR); Yong-yeon Lee, Gyeonggi-do (KR)

(73) Assignee: Samsung Electronics Co., Ltd. (KR)

(*) Notice: Subject to any disclaimer, the term of this patent is extended or adjusted under 35 U.S.C. 154(b) by 1047 days.

(21) Appl. No.: 13/251,710

(22) Filed: Oct. 3, 2011

(65) Prior Publication Data

US 2012/0086711 A1 Apr. 12, 2012

(30) Foreign Application Priority Data

Oct. 12, 2010 (KR) .................. 10-2010-0099339

(51) Int. Cl.
*G06T 15/00* (2011.01)
*H04N 13/00* (2006.01)
*H04N 13/04* (2006.01)

(52) U.S. Cl.
CPC ......... *H04N 13/007* (2013.01); *H04N 13/0456* (2013.01)

(58) Field of Classification Search
None
See application file for complete search history.

(56) References Cited

U.S. PATENT DOCUMENTS

| 6,253,218 | B1* | 6/2001 | Aoki | G06F 17/30126 707/999.007 |
| 6,577,330 | B1 | 6/2003 | Tsuda et al. | |
| 6,590,573 | B1* | 7/2003 | Geshwind | G06T 19/00 345/419 |
| 2001/0045979 | A1* | 11/2001 | Matsumoto | G06K 9/20 348/43 |
| 2006/0020962 | A1* | 1/2006 | Stark | G06F 17/30861 725/32 |
| 2007/0283290 | A1* | 12/2007 | Dubinko | G06F 17/30994 715/784 |
| 2009/0022357 | A1* | 1/2009 | Katz | H04N 1/00198 382/100 |
| 2009/0115901 | A1* | 5/2009 | Winter | H04N 5/262 348/565 |
| 2010/0073636 | A1* | 3/2010 | Sasaki | G02B 27/0093 353/13 |
| 2010/0077334 | A1* | 3/2010 | Yang | G06F 3/0486 715/769 |
| 2010/0246954 | A1* | 9/2010 | Kim | G06K 9/3233 382/170 |

FOREIGN PATENT DOCUMENTS

| JP | 10187743 | 7/1998 |
| JP | 3705826 | 10/2005 |
| KR | 1020100055781 | 5/2010 |

* cited by examiner

*Primary Examiner* — Kate Luo
(74) *Attorney, Agent, or Firm* — The Farrell Law Firm, P.C.

(57) ABSTRACT

A method and a 3D display apparatus for displaying a content list by setting a depth value of each content to be displayed on the content list according to content information, according to the plurality of content, and displaying 3D content list GUI including a left-eye GUI and a right-eye GUI to which a set depth value for each of the content is applied. Accordingly, the 3D display apparatus can display the content list using the stereo 3D GUI.

10 Claims, 10 Drawing Sheets

METHOD OF DISPLAYING CONTENT LIST USING 3D GUI AND 3D DISPLAY APPARATUS APPLIED TO THE SAME

PRIORITY

This application claims priority under 35 U.S.C. §119(a) to Korean Patent Application No. 10-2010-0099339, filed on Oct. 12, 2010, in the Korean Intellectual Property Office, the entire disclosure of which is incorporated herein by reference.

BACKGROUND OF THE INVENTION

1. Field of the Invention

The present invention relates generally to a method of displaying a content list and a Three-Dimensional (3D) display apparatus applied to the same, and more particularly, to a method of displaying a content list and a three-dimensional (3D) display apparatus applying the same, which provide a content list using 3D Graphical User Interface (GUI) in the stereo 3D image environment.

2. Description of the Related Art 3D stereoscopic imaging technology may be applied to many fields such as information communication, broadcasting, medical care, education training, military, game, animation, virtual reality, Computer Aided Design (CAD), or industry technology and it may be a core technology of the next 3D stereoscopic multimedia information communication commonly required in these fields.

Generally, a 3D effect perceived by a person is generated through the combination of the degree of thickness variation of the crystalline lenses based on the object to be observed, the difference of angle between the eye and the target, the difference between the positions and shapes of the target viewed by the left and right eyes, the parallax caused by the motion of the target, the effects by various psychologies and memories, or the like.

One important factor in achieving the 3D effect is the binocular disparity caused by the human eyes which are positioned about 6 to 7 cm away from each other. That is, a person views the target with the angle difference for the target due to the binocular disparity, the images which meet their eyes have different phases, and the brain precisely fuses two pieces of information when two images are transferred through the retinas so that the person can perceive the original 3D stereoscopic image.

The 3D image display apparatus is divided into a glasses type using specific glasses and an autostereoscopic type without using specific glasses. The glasses type apparatus uses a color filter method which separates and selects an image using color filters having mutual complementary color relationships, a polarized filter method which separates an image into a left-eye video and a right-eye video using a light-shielding effect with combination of orthogonal polarizers, and a shutter glasses method which makes viewers perceive the 3D effect by alternatively shielding a left-eye video and a right-eye video in response to a synchronization signal which projects the left-eye video signal and the right-eye video signal on a screen.

The 3D image constitutes a left-eye video perceived by the left eye and a right-eye video perceived by the right eye. The 3D display apparatus represents 3D effect of the image using the disparity between the left-eye video and the right-eye video. Likewise, the environment which implements the 3D image by alternatively displaying the left-eye video and the right-eye video is called as a stereo 3D image environment.

The method of changing transparence or texture, or of processing shadow is used in order to represent the 3D effect in the two-dimensional (2D) image. However, when the 3D display apparatus is used, the 3D effect can be assigned to GUI. Therefore, there is a need for a method for providing 3D GUI in the 3D display apparatus.

SUMMARY

An aspect of the present invention is to substantially solve at least the above problems and/or disadvantages and to provide at least the advantages below.

One or more embodiments provide a method of displaying a content list which sets a depth value of each content to be displayed on the content list according to content information, and displays a three-dimensional (3D) content list graphic user interface (GUI) to which the set depth value for each of the content is applied, and a 3D display apparatus applied to the same.

According to an aspect of the present invention, there is provided a method of displaying a content list for a plurality of content. The method includes setting a depth value of each content to be displayed on the content list according to content information, according to each of the plurality of content, and displaying 3D content list GUI including a left-eye GUI and a right-eye GUI to which a set depth value for each of the content is applied.

According to another aspect of the present invention, there is provided a display apparatus which displays a content list for a plurality of content. The display apparatus includes a control unit which sets a depth value of each content to be displayed according to the content information, according to each of the plurality of content, and a display unit which displays 3D content list GUI including a left-eye GUI and a right-eye GUI to which a set depth value for each of the content is applied.

As described above, according to the embodiments of the present invention, the method of displaying content list and the 3D display apparatus applied to the same, which set a depth value of each content to be displayed on a content list based on the content information, and display a three-dimensional (3D) content list graphic user interface (GUI) to which the set depth value for each of the content is applied, are provided so that the 3D display apparatus can display the content list using stereo 3D GUI. Particularly, since the depth values are differently set based on the content information, a user can check the classification based on the content list at a glance.

Further, the 3D display apparatus can implement the 3D GUI by controlling disparity between the left-eye GUI and the right-eye GUI to obtain the 3D effect, thereby providing the 3D GUI without an additional image processing process (scaling, texture, perspective effect processing, or the like).

Additional aspects and advantages of the embodiments will be set forth in the detailed description, will be clear from the detailed description, or may be learned by practicing the embodiments.

BRIEF DESCRIPTION OF THE DRAWINGS

The above and/or other aspects will be more apparent by describing in detail embodiments, with reference to the accompanying drawings, in which.

DETAILED DESCRIPTION OF EMBODIMENTS OF THE PRESENT INVENTION

Hereinafter, embodiments of the present invention will be described in detail with reference to the accompanying drawings.

In the following description, same reference numerals may be used in reference to the same or similar elements in different drawings. The matters defined in the description, such as detailed construction and elements, are provided to assist in a comprehensive understanding of the embodiments. Thus, embodiments of the present invention may be implemented with or without some of these specifically defined matters. Well-known functions or elements may not be described in detail in order to avoid obscuring the subject matter of the present invention with unnecessary detail.

Figure 1:
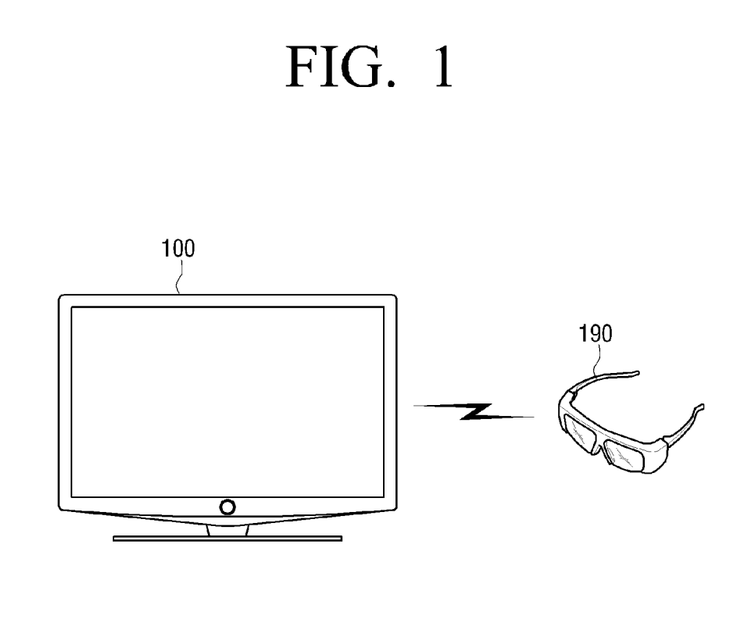
FIG. 1 is a diagram illustrating an external appearance of a three-dimensional (3D) television (TV) according to an embodiment of the present invention.

FIG. 1 is a diagram illustrating an external appearance of a three-dimensional (3D) Television (TV) 100 according to an embodiment of the present invention. As illustrated in FIG. 1, the 3D TV 100 may communicate with 3D glasses 190.

The 3D TV 100 alternatively generates and displays a left-eye video and a right-eye video and a user can watch a 3D stereoscopic image by alternatively seeing the left-eye video and the right-eye video displayed on the 3D TV 100 with the left eye and the right eye using the 3D glasses 190.

More specifically, the 3D TV 100 generates the left eye video and the right-eye video and alternatively displays the generated left-eye video and right-eye video on a screen at regular time intervals. The 3D TV 100 generates synchronous signals for the generated left-eye video and right-eye video to the 3D glasses 190.

The 3D glasses 190 receive the synchronous signals from the 3D TV 100 and alternatively open a left-eye glass and a right-eye glass in synchronization with the left-eye video and the right-eye video displayed on the 3D TV 100.

Likewise, the user can watch the 3D image on the 3D TV 100 using the 3D glasses 190.

Further, the 3D TV 100 may display 3D Graphic User Interface (GUI) on the screen together with the 3D image. Since the 3D GUI is needed to set functions of the 3D TV 100 and select content, the 3D TV 100 also requires GUI.

The 3D TV 100 makes the GUI be included in the left-eye and right-eye videos to have a specific depth value, thereby displaying the GUI. Specifically, the 3D TV 100 may display the GUI in a depth value corresponding to a position of the screen surface.

When displaying the 3D content list GUI, the 3D TV 100 may set a depth value of each of content items according to content information. The 3D TV 100 displays the content items of the 3D content list GUI in the set depth values. Here, the 3D content list GUI indicates user interface which displays a list for content selectable by a user and inputs a user command for content selection therethrough.

Therefore, the 3D TV 100 can display the 3D content list GUI in which the depth values of the content items are set according to the content information.

Figure 2:
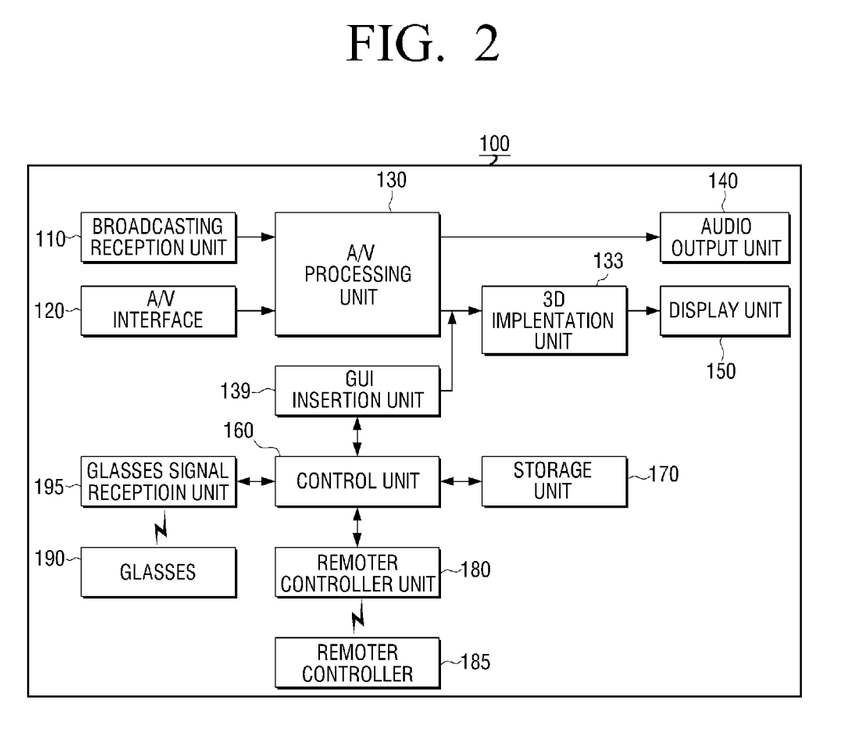
FIG. 2 is a block diagram illustrating a configuration of a 3D TV according to an embodiment of the present invention.

FIG. 2 a block diagram illustrating a detailed configuration of the 3D TV 100 according to an embodiment. Referring to FIG. 2, the 3D TV 100 includes a broadcasting reception unit 110, an audio/video (A/V) interface 120, an A/V processing unit 130, a 3D implementation unit 133, a GUI insertion unit 139, an audio output unit 140, a display unit 150, a control unit 160, a storage unit 170, a remote controller reception unit 180, and a glasses signal transmission/reception unit 195.

The broadcasting reception unit 110 receives broadcasting from broadcasting stations or satellites in a wired or wireless manner and modulates a broadcasting signal. In addition, the broadcasting reception unit 110 receives a 3D image signal including 3D image data.

The A/V interface 120 is connected to an external apparatus (not illustrated) and receives an image from the external apparatus. Particularly, the A/V interface 120 may receive 3D image data from the external apparatus. For example, the A/V interface 120 may be an interface using S-Video, component, composite, D-Sub, Digital Video Interface (DVI), High-Definition Multimedia Interface (HDMI), or the like.

Here, the 3D image data denotes data including 3D image information. The 3D image data includes left-eye video data and right-eye video data in one data frame region. The kind of 3D image data is classified according to a format including the left-eye video data and the right-eye video data. For example, the 3D image data is classified into an interleaving scheme, a side by side scheme, an above-below scheme, or the like.

The A/V processing unit 130 performs signal processing such as video decoding, video scaling, or audio decoding for a video signal and an audio signal input from the broadcasting reception unit 110 and the A/V interface 120.

Specifically, the A/V processing unit 130 performs signal processing such as audio decoding for the input audio signal. The A/V processing unit 130 outputs the audio signal processed to the audio output unit 140.

In addition, the A/V processing unit 130 performs signal processing such as video decoding and video scaling for the input video signal. The A/V processing unit 130 outputs 3D video data to the 3D implementation unit 133 when the 3D video data is input.

The 3D implementation unit 133 generates a left-eye video and a right-eye video which are interpolated to a size of one screen using the input 3D video data. That is, the 3D implementation unit 133 generates the left-eye video and the right-eye video to be displayed on the screen in order to implement the 3D stereoscopic image.

Specifically, the 3D implementation unit 133 separates left-eye video data and right-eye video data from the input 3D video data. Since the left-eye video data and the right-eye video data are included in one frame data of the received 3D video data, the separated left-eye video data and right-eye video data have video data corresponding to a half of a total size of the screen, respectively. Therefore, the 3D implementation unit 133 doubles size magnifies or interpolates the separated left-eye video data and right-eye data to generate a left-eye video and a right-eye video to be displayed on a screen having one screen size.

The 3D implementation unit 133 outputs the generated left-eye video and the right-eye video to the display unit 150.

The GUI insertion unit 139 generates GUI to be displayed to the user and inserts the generated GUI into a 3D image under the control of the control unit 160. The GUI insertion unit 139 inserts the generated GUI into the input 3D video data before the 3D video data is input to the 3D implementation unit 133. Therefore, 3D video data in which On Screen Display (OSD) is inserted is input to the 3D implementation unit 133.

Particularly, the GUI insertion unit 139 may generate 3D content list GUI indicating a list for a plurality of content and insert the generated 3G content list GUI into the 3D video. At this time, in the 3D content list GUI, depth values of content items are differently set and displayed according to the content information.

The audio output unit 140 outputs audio transmitted from the A/V processing unit 130 to a speaker, or the like.

The display unit 150 outputs video transmitted from the 3D implementation unit 133 to be displayed on the screen. Particularly, in the case of the 3D video, the display unit 150 alternatively outputs the left-eye video and the right-eye video on the screen.

The display unit 150 displays the 3D content list GUI to which the set depth values for content are applied to. At this time, the display unit 150 alternatively displays left-eye GUI and right-eye GUI for the 3D content list GUI. Thereby, the display unit 150 displays the content list GUI in the stereo 3D environment.

The storage unit 170 records and stores the image received from the broadcasting reception unit 110 or the A/V interface unit 120. The storage unit 170 stores various kinds of content files. For example, the storage unit 170 may store various content files such as moving image content, photo content, or document content. The storage unit 170 may be implemented by a hard disc, a nonvolatile memory, or the like.

The remote controller reception unit 180 inputs user input from a remote controller 185.

The glasses signal transmission/reception unit 70 transmits a clock signal for alternatively opening a left-eye glass and a right-eye glass of the 3D glasses 190. The glasses 190 alternatively open the left-eye glass and the right-eye glass according to the received clock signal.

The control unit 160 processes a user command based on the user input content transferred from the remote controller 185 and controls an overall operation of the 3D TV 100 according to the understood user command.

The control unit 160 sets the depth values of the content to be displayed on the content list according to the content information, according to each of the plurality of content. The control unit 160 controls the display unit 150 display the 3D content list GUI including the left-eye GUI and the right-eye GUI to which the set depth values for the content are applied.

Here, the content information may be meta data of content. That is, the control unit 160 may obtain the content information using the meta data stored in the content file. Specifically, the content information may be at least one of a content file name, title, creation date, genre, and content type.

The content file name indicates a file name of a content file can include the extension.

The title indicates a title of content included in the meta data of content. When the content is a movie, the title of the content is a title of the movie. When the content is music, the title of the content is a title of the music.

The creation date indicates the date on which the content is created and corresponds to information recorded in the meta data. The creation date may include a creation year, creation month, creation day, and creation time.

The genre indicates a detailed category of the content. For example, when the content is a movie, the genre may be at least one of a melodrama, thriller, comedy and science fiction.

The kind of content is information indicating what kind of content it is and may be at least one of kinds such as a movie, music, or text.

The control unit 160 may use the information for such a content to set a depth value.

The depth value denotes a numerical value indicating a degree of a sense of depth in the 3D image. The 3D image may represent a sense of depth corresponding to positions of a top and bottom and left and right on the screen as well as positions to a front and rear direction which is a line of sight of a viewer. At this time, the sense of depth depends on disparity between the left-eye video and the right-eye vide and therefore, the depth value of the 3D content list GUI corresponds to the disparity between the left-eye GUI and the right-eye GUI. The relationship between the depth value and the disparity will be described with reference to FIGS. 5 and 6 in detail.

In addition, the control unit 160 may classify the plurality of content included in the content list into the specific number of groups according to the content information. Here, the group may be classified into classes of content which have the same specific information. At this time, the control unit 160 may set the depth value so that the content included in the same group have the same depth value.

For example, the control unit 160 may classify the content by kind of content and then set the depth values according to classified kind of the content. Specifically, the control unit 160 may set the depth value of a movie content to "0" (zero), the depth value of a photo content "−1", and the depth of a document content to "−2".

The control unit 160 may set alignment criterion of the content list and set the depth value for each of content to be displayed on the content list according to the content information.

Here, the alignment criterion indicates criterion for aligning the content of the 3D content list GUI. For example, the alignment criterion may be at least one of an order by the latest date, an order by title and an order by creation date.

The control unit 160, when an alignment criterion change command of the content list is input, resets the depth value of each of the content to be displayed on the content list according to the content information corresponding to the changed alignment criterion.

For example, in the case where the alignment criterion is an order by the latest date, the control unit 160 set the depth value of each of the content of the content list to an order by the latest reproduction. Afterwards, when the alignment criterion is changed to an order by title by the user, the control unit 160 reset the depth values of the content in an order by title and displays the reset depth values.

The control unit 160, when a depth value of a specific content from a first depth value to a second depth value, controls the display unit 150 display a process of changing the depth value of the specific content from the first depth value to the second depth value via any one of intermediate values between the first depth value and the second depth value. That is, the control unit 160 changes the depth value via some intermediate values, thereby displaying the depth values more naturally changed without directly changing the depth value from the first depth value to the second depth value and displaying the changed depth value.

For example, when a depth value of a specific content item is changed from "−4" to "0", the control unit 160 displays the specific content item to the depth values −3, −2, and −1 once, respectively so that the depth value is smoothly changed and displayed from "−4" to "0".

The 3D TV 100 according to the above-described configuration can display the content list using the stereo 3D GUI. Particularly, since the depth values are differently set according to the content information, the user can check the classification according to the content information at a glance.

The 3D TV can control only the disparity between the left-eye GUI and the right-eye GUI in order to obtain the 3D effect to implement the 3D GUI, so that the 3D TV 100 can provide the 3D GUI without a separate image processing process (scaling, texture, perspective effect processing, or the like).

Figure 3:
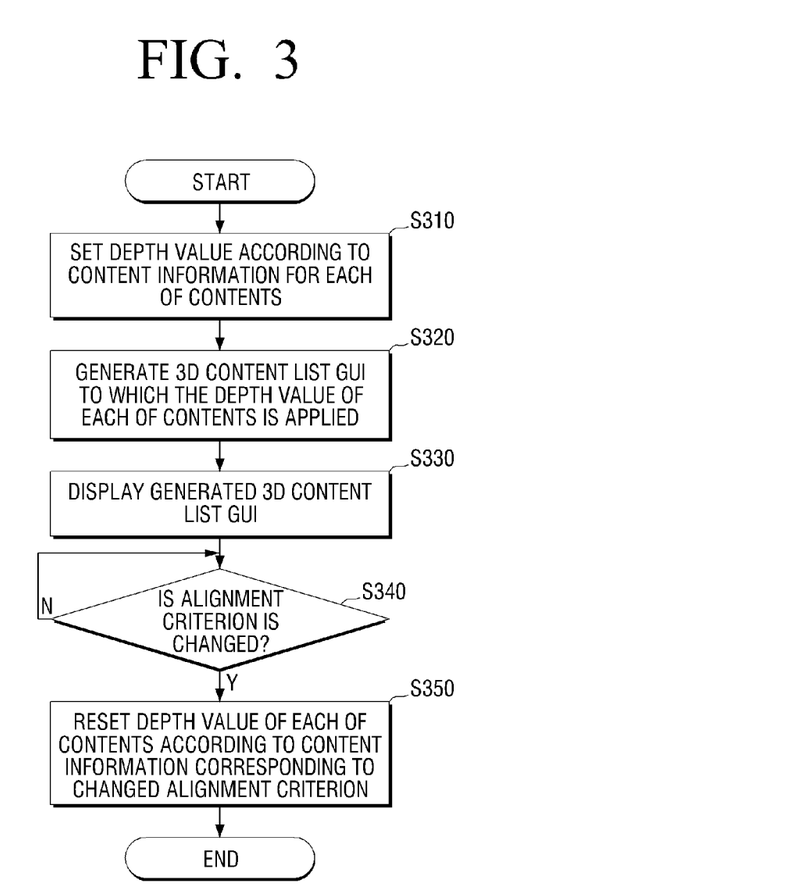
FIG. 3 is a flowchart illustrating a method of displaying a content list according to an embodiment of the present invention.

FIG. 3 is a flow chart illustrating a method of displaying a content list according to an embodiment of the present invention.

First, the 3D TV 100 sets a depth value of each content to be displayed on a screen according to content information, according to a plurality of content in step S310. Then, the 3D TV 100 generates a 3D content list GUI including a left-eye GUI and a right-eye GUI to which the set depth value of each of the content are applied in step S320.

The 3D TV 100 displays the generated 3D content list GUI on a screen in step S330.

Here, the content information may be meta data of the content. That is, the 3D TV 100 obtains the content information using the meta data stored in the content files. Specifically, the content information may be at least one of a file name of content, title, creation date, genre, and content type. The 3D TV 100 may use such content information to set the depth value.

At this time, the 3D TV 100 classifies the plurality of content included in a content list into the specific number of groups according to the content information. At this case, the 3D TV set the content included in the same group to have the same depth value.

For example, the 3D TV 100 may classify the content by a content type and sets the depth value. Specifically, the 3D TV 100 may set a movie content to a depth value "0", a photo content to a depth value "−1" and a document content to a depth value "−2".

In addition, the 3D TV 100 may set an alignment criterion of the content list and set the depth value of each content to be displayed on a content list according to the content information corresponding to the alignment criterion.

Here, the alignment criterion indicates criterion for aligning content of the 3D content list GUI. For example, the alignment criterion may be at least one of an order by the latest date, an order by title and an order by creation date.

The 3D TV 100 determines whether an alignment criterion change command is input in step S340. If it is determined that the alignment criterion change command of the content list is input, the 3D TV 100 resets the depth value of each of the content to be displayed on the content list according to the content list corresponding to the changed alignment criterion in step S350.

For example, when the alignment criterion is an order by the latest date, the 3D TV 100 set the depth value of each of content items of the content list to an order by the latest reproduction. Afterward, when the alignment criterion is changed into the order by title by a user, the 3D TV 100 resets the depth value of each of the content items in an order by title and displays the reset depth values.

The 3D TV 100, when a depth value of a specific content is changed from a first depth value to a second depth value, displays a process of changing the depth value of the specific content from the first depth value to the second depth value via any one of intermediate values between the first value depth and the second depth value. That is, the 3D TV 100 can represent a process of more naturally changing the depth value of the specific content from the first depth value to the second depth value via any one of intermediate values between the first depth value to the second depth value without directly changing and displaying the depth value of the specific content from the first depth value to the second depth value.

For example, when the depth value of a specific content item is changed from "−4" to "0", the 3D TV 100 displays the specific content item to the depth values "−3". "−2", and "−1" once, respectively and thus the depth value is smoothly changed and displayed from "−4" to "0".

Through the process above, the 3D TV 100 can display the content list using the stereo 3D GUI. Particularly, since the depth values are differently set according to the content information, the user can check the classification according to the content information at a glance.

In addition, the 3D TV 100 can implement the 3D GUI only by controlling the disparity between the left-eye GUI and the right-eye GUI to obtain the 3D effect so that the 3D TV 100 can provide the 3D GUI without separate image processing process (scaling, texture, perspective effect processing, or the like).

Figure 4A:
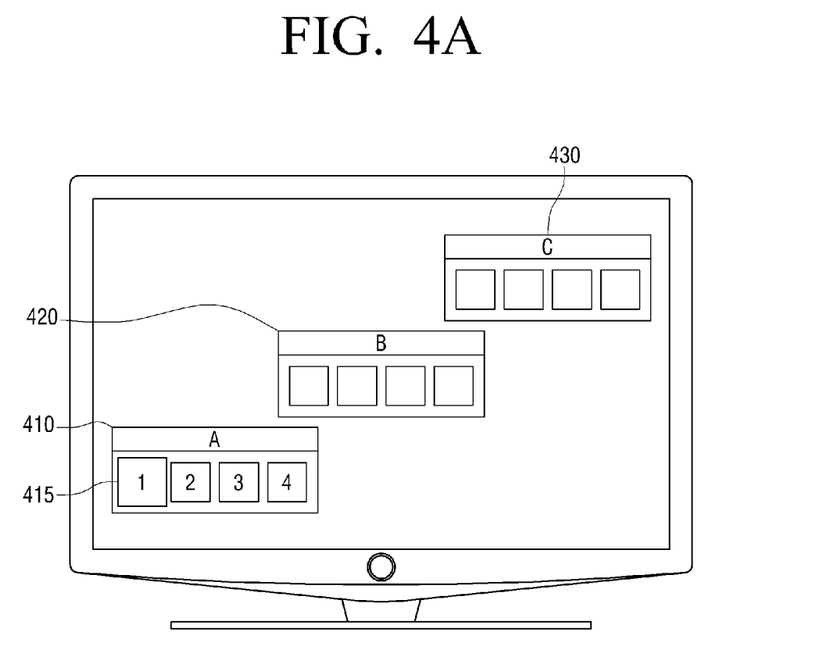
FIGS. 4A and 4B are diagrams illustrating structures of 3D content lists according to an embodiment of the present invention.
Figure 4B:
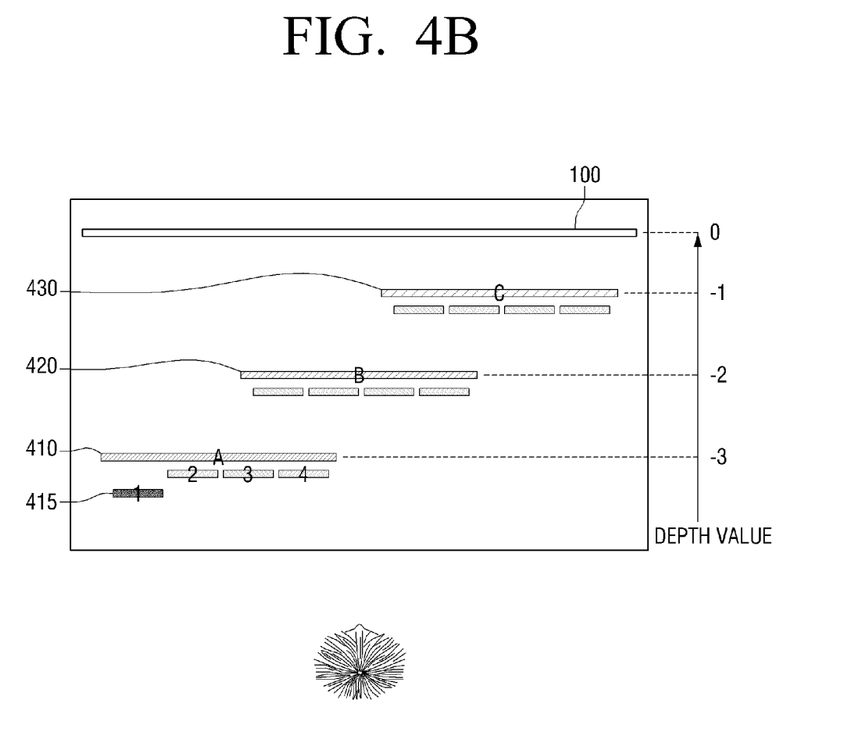

FIGS. 4A and 4B are diagrams illustrating structures of 3D content list GUI according to an embodiment of the present invention.

FIG. 4A is a diagram illustrating the state that the 3D content list GUI is displayed on a screen of the 3D TV 100. It can be seen from FIG. 4A that the 3D content list GUI includes three groups 410, 420 and 430 and each group includes 4 content items.

Here, the groups may be classified into classes in which content has the same specific information. For example, the first group 410 may be content that a creation date is "9 Oct. 2010", the second group 420 may be content that a creation date is "8 Oct. 2010", and the third group 430 may be content that a creation date is "7 Oct. 2010". In this case, the 3D TV 100 sets and displays the content included in the same group on the 3D content list GUI to have the same depth value.

Further, the content currently highlighted in FIG. 4A is a first content 415 of the first group 410 and thus the first content 415 is displayed in front of other content of the first group 410.

FIG. 4B is a diagram illustrating a depth value of the 3D content list GUI. As illustrated in FIG. 4B, the first group 410 is displayed so that a depth value becomes "−3", the second group 420 is displayed so that a depth value becomes "−2", and the third group 430 is displayed so that a depth value becomes "1".

Further, it can be seen that the first content which is a highlighted content is displayed to protrude to a viewer as compared with the other content.

As described above, it can be seen that the 3D TV 100 can set the depth values of the content to be different using the content information (for example, a creation date) to display the 3D content list GUI.

At this time, the depth value is determined by the disparity between a left-eye video and a right-eye video and its description will be described with reference to FIGS. 5 and 6 in more detail.

Figure 5:
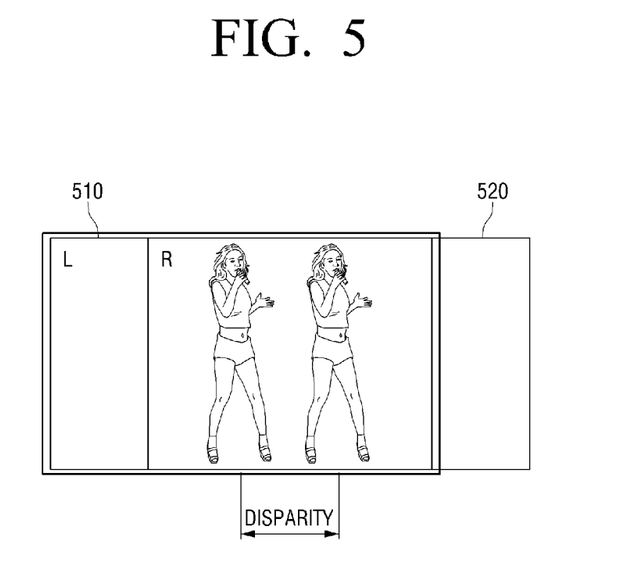
FIG. 5 is a diagram illustrating disparity between a left-eye video and a right-eye video according to an embodiment of the present invention.

FIG. 5 is a diagram illustrating the disparity between a left-eye video and a right-eye video according to an embodiment of the present invention. FIG. 5 illustrates that an object 510 of the left-eye video and an object 520 of the left-eye video overlap. However, when the left-eye and right-eye videos are substantially displayed, the object 510 of the left-eye video and the object 520 of the right-eye video are alternatively displayed.

As illustrated in FIG. 5, a degree that the object 510 of the left-eye video and the object 520 of the right-eye video are mismatched is called as the disparity.

Figure 6:
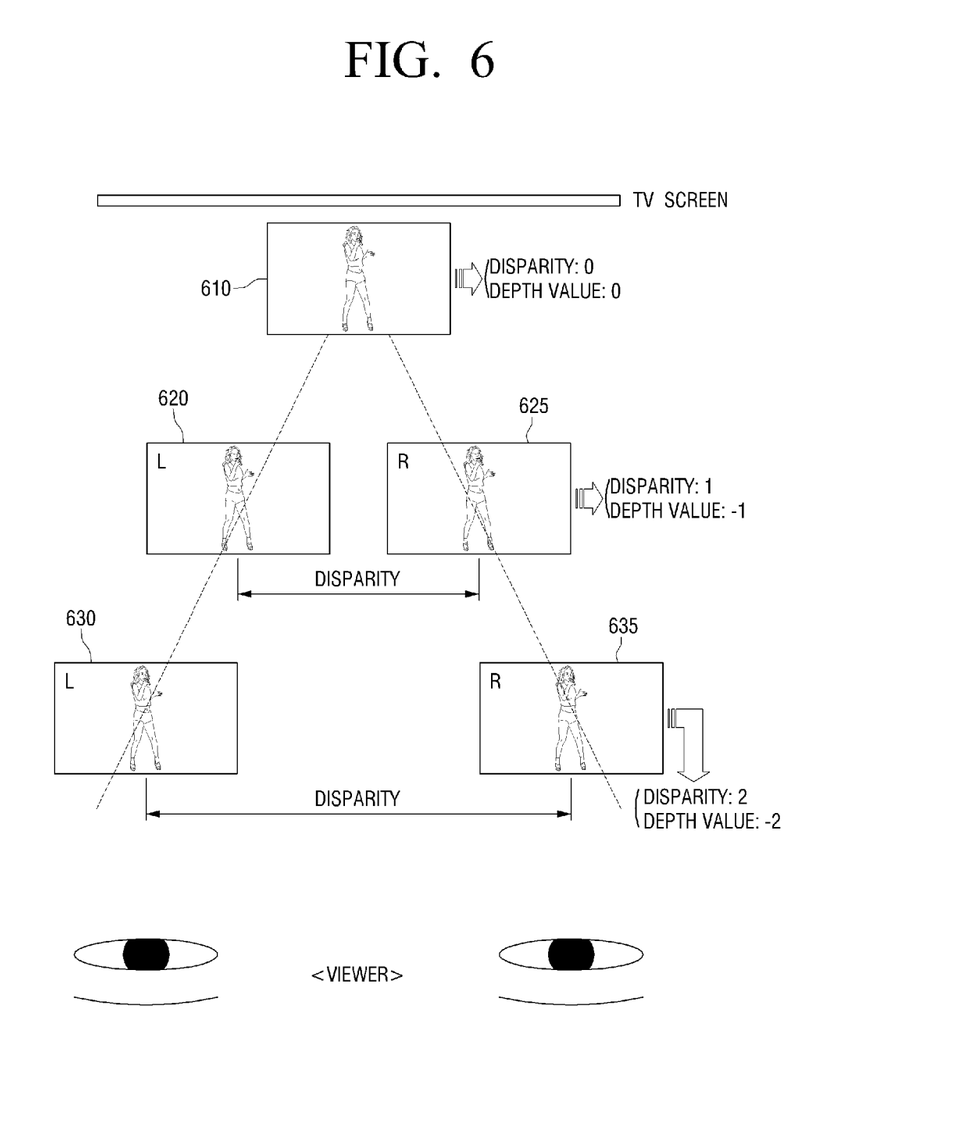
FIG. 6 is a diagram illustrating relationship between disparity and a depth value according to an embodiment of the present invention.

FIG. 6 is a diagram illustrating the relationship between the disparity and the depth value according to an embodiment of the present invention. FIG. 6 illustrates the disparity generated between a TV screen and the eyes of a user. Since the user has two eyes, the disparity is due to a distance between two eyes.

As illustrated in FIG. 6, it can be seen that the disparity is increased as the object is close to the user. Specifically, when an object located on a surface (that is, the depth value is "0") of a TV screen is displayed, the left-eye and right-eye videos 610 are displayed at one position without the disparity. On the other hand, when the object is displayed at a position that the depth value is "−1", that is, a position that the object is a little close to the viewer, the left-eye video 620 and the right-eye video 625 have to be displayed on a positions which are spaced apart by the disparity "1" from each other. When the object is displayed at a position that the depth value is "−2", that is, a position that the object is more close to the viewer, the left-eye video 630 and the right-eye video 635 have to be displayed on a positions which are spaced apart by the disparity "2" from each other.

Likewise, it can be seen that the depth value is a value corresponding to the disparity.

Therefore, the 3D TV 100 can set the depth value of each of the content in the 3D content list GUI using the disparity between the left-eye GUI and the right-eye GUI without separate image processing.

Figure 7:
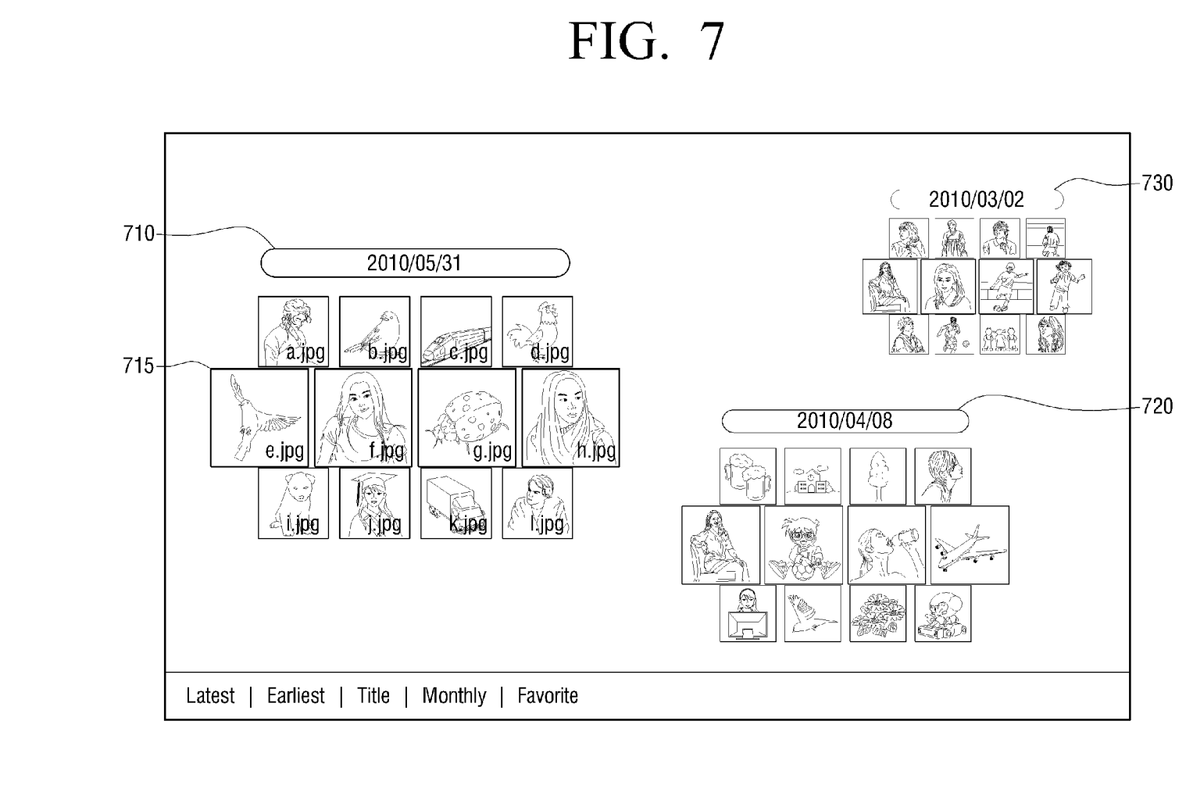
FIG. 7 is a diagram illustrating 3D content list graphic user interface (GUI) according to an embodiment of the present invention
Figure 8:
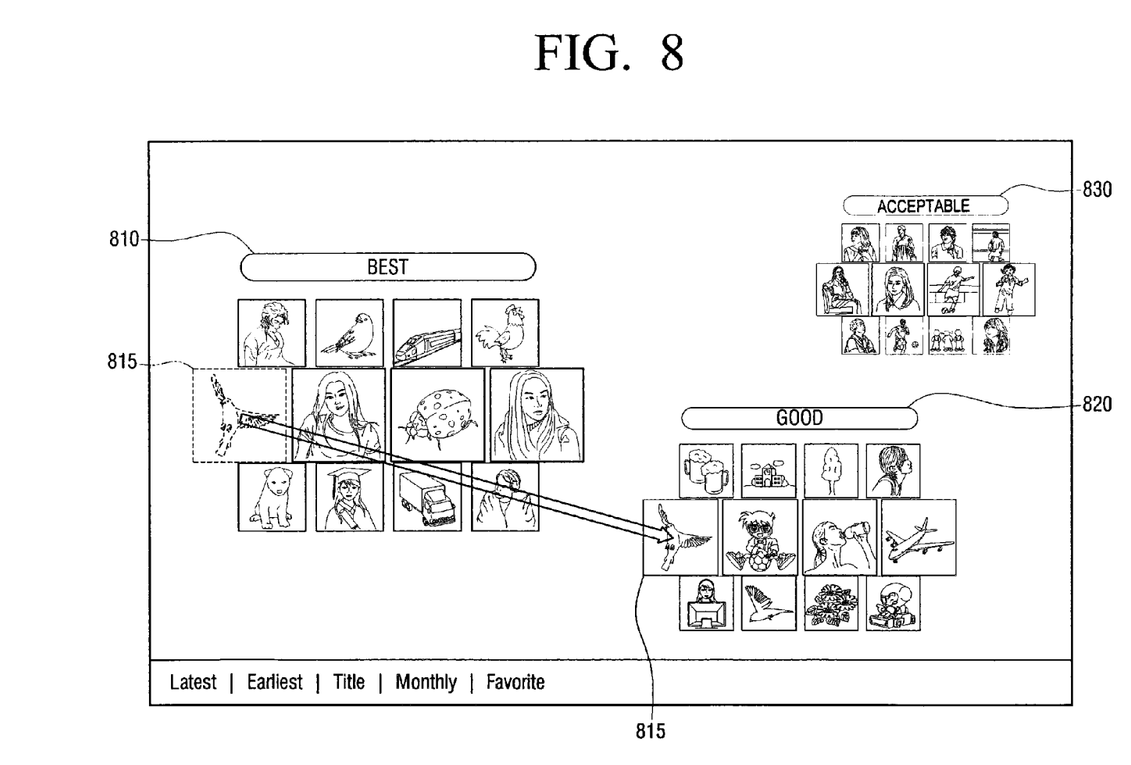
FIG. 8 is a diagram illustrating the case where a content item is moved to other groups in a 3D content list GUI according to an embodiment of the present invention.
Figure 9:
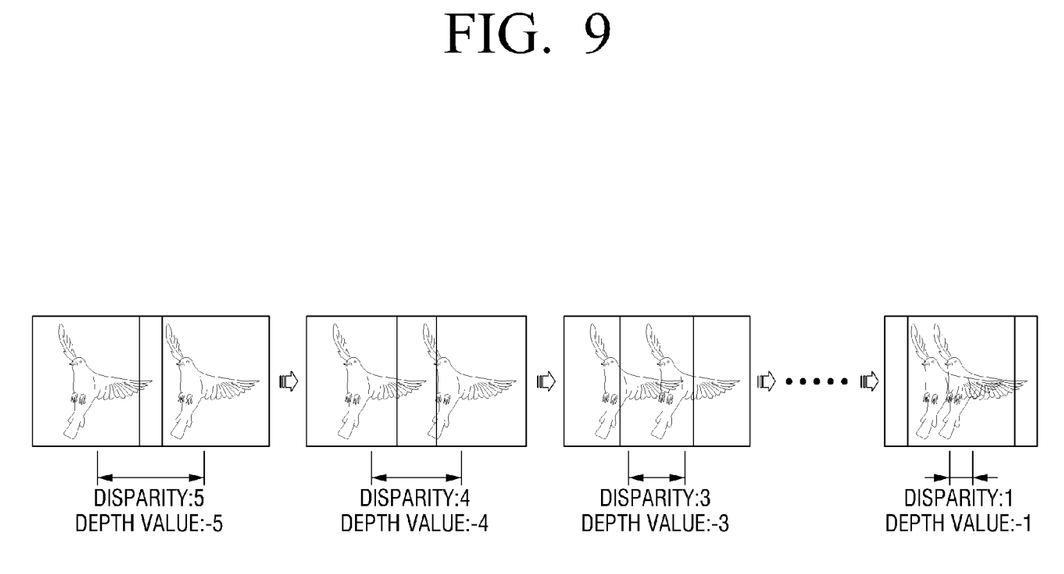
FIG. 9 is a diagram illustrating a process of naturally changing a depth value when a depth value of a content list is changed according to an embodiment of the present invention.

Hereinafter, the 3D content list GUI will be described with reference to FIGS. 7 and 9. In FIGS. 7 to 9, elements are illustrated in a two-dimensional (2D) state. However, it should be noted that the stereo 3D GUI implemented by alternatively displaying the left-eye GUI and the right-eye GUI is substantially displayed.

FIG. 7 is a diagram illustrating the 3D content list GUI according to an embodiment of the present invention. It can be seen that the 3D content list GUI includes 3 groups 710, 720 and 730 in FIG. 7.

In FIG. 7, the alignment criterion of the 3D content list GUI is ordered by creation date and file name. Specifically, the groups of the 3D content list GUI are aligned by creation date and the content in one group is aligned by file name.

The 3D TV 100 sets a depth value for each of content files. For example, a process of setting a depth value of an e.jpg file 715 will be described. The 3D TV 100, first, checks meta data of the e.jpg file 715 to set the depth value of the e.jpg file 715. The 3D TV 100 extracts information that a creation date is "31 May 2010" and file name "e.jpg" from information of the e.jpg file 715 using the meta data. The 3D TV 100 determines that the e.jpg file 715 belongs to the first group 710 using the information that the creation date is "31 May 31 2010". The 3D TV 100 understands that a position that the e.jpg file 715 is to be located is on the leftmost side of the center line using the information for the file name of the e.jpg file 715. The 3D TV 100 sets the depth of the e.jpg file 715 by aggregating such the information for the e.jpg file 715.

The 3D TV 100 performs the above-described process for all content files. The 3D TV 100 sets the depth values of the all content files through the above-described process and displays the 3D content list GUI as illustrated in FIG. 7 by applying the set depth values, respectively.

The user watches the 3D TV 100 using the 3D glasses 190, thereby viewing the 3D content list GUI as illustrated in FIG. 7.

FIG. 8 is a diagram illustrating the case where a content item is moved to other groups in the 3D content list GUI according to an embodiment of the present invention. FIG. 8 illustrates that an alignment criterion for the group of the 3D content list GUI is favorite. Specifically, a first group 810 corresponds to the best group, a second group 820 corresponds to a good group, and 830, a third group corresponds to an acceptable group.

As illustrated in FIG. 8, when a specific content file 815 is moved from the first group 810 to the second group 820, a depth value for the specific file 815 is changed. For example, when depth values of content items displayed in the first group 810 is "−5" and depth values of content items displayed in the second group 820 is "−1", the depth value of the specific content file 815 is changed from "−5" to "−1".

In this case, the 3D TV 100 may not directly change the depth value from "−5" to "−1", but it may change and display the depth value from "−5" to "−1" via some intermediate values in order to naturally change the depth value. Description for the process will be described with reference to FIG. 9.

FIG. 9 is a diagram illustrating a process of naturally changing a depth value when the depth of a content item is changed according to an embodiment of the present invention. As illustrated in FIG. 9, the 3D TV 100, when changing the depth value from "−5" to "−1", can more naturally display the process of changing the depth value by changing the depth value in a "−1" unit.

As described above, the 3D TV 100 can set the depth value according to the content information and display the 3D content list GUI having various depths.

On the other hands, in the embodiment, the 3D TV is illustrated as the display apparatus, but it is only an example and any apparatus which is capable of displaying the 3D image may be applied thereto. For example, the display apparatus may be a 3D monitor, a 3D portable computer, or the like in addition to the 3D TV.

The foregoing embodiments and advantages are merely provided as examples and are not to be construed as limiting the present inventive concept. The embodiments can be readily applied to other types of apparatuses. Also, the description of the embodiments is intended to be illustrative, and not to limit the scope of the claims, and many alternatives, modifications, and variations will be apparent to those skilled in the art.

What is claimed is:

1. A method of displaying a content list, the method comprising:
    displaying a content list in a first sequence based on a first type of metadata, the content list comprising a plurality of content groups, each group having same metadata information corresponding to the first type of metadata and a first depth value; and
    if a command for changing an alignment criterion of the content list from the first type of metadata to a second type of metadata is input, displaying a changed content list in a second sequence based on the second type of metadata, the changed content list comprising a plurality of content groups, each group having same metadata information corresponding to the second type of metadata and a second depth value, wherein each of the content list and the changed content list includes a left-eye GUI and a right-eye GUI corresponding to the first depth value or the second depth value corresponding to each of the content list and the changed content list.

2. The method as claimed in claim 1, wherein the first depth value or second depth value corresponds to disparity between the left-eye GUI and the right-eye GUI.

3. The method as claimed in claim 1, wherein the metadata information includes metadata of a content.

4. The method as claimed in claim 1, wherein the metadata information includes at least one of a file name of content, title, creation date, genre and content type.

5. The method as claimed in claim 1, further comprising, if a depth value of a specific content is changed from the first depth value to the second depth value:

displaying a process of changing the depth value of the specific content from the first depth value to the second depth value via at least one of intermediate values between the first depth value and second depth value.

6. A display apparatus which displays a content list, the display apparatus comprising:

a display unit configured to display a content list;

a control unit configured to control the display unit to display the content list in a first sequence based on a first type of metadata, the content list comprising a plurality of content groups, each group having same metadata information corresponding to the first type of metadata and a first depth value, if a command for changing an alignment criterion of the content list from the first type of metadata to a second type of metadata is input, the control unit is configured to control the display unit to display a changed content list in a second sequence based on the second type of metadata corresponding to the second type of metadata and a second depth value, wherein each of the content list and the changed content list includes a left-eye GUI and a right-eye GUI corresponding to the first depth value or the second depth value corresponding to each of the content list and the changed content list.

7. The display apparatus as claimed in claim 6, wherein the first depth value or second depth value corresponds to disparity between the left-eye GUI and the right-eye GUI.

8. The display apparatus as claimed in claim 6, wherein the metadata information includes meta data of a content.

9. The display apparatus as claimed in claim 6, wherein the metadata information includes at least one of a file name of content, title, creation date, genre and content type.

10. The display apparatus as claimed in claim 6, wherein the control unit, if a depth value of a specific content is changed from the first depth value to the second depth value, controls the display unit to display a process of changing of the depth value of the specific content from the first depth value to the second depth value via at least one of intermediate values between the first depth value and second depth value.

* * * * *